July 28, 1964     E. B. DANE, JR     3,142,182
GYROSCOPE SPIN AXIS BEARINGS
Filed Feb. 23, 1961
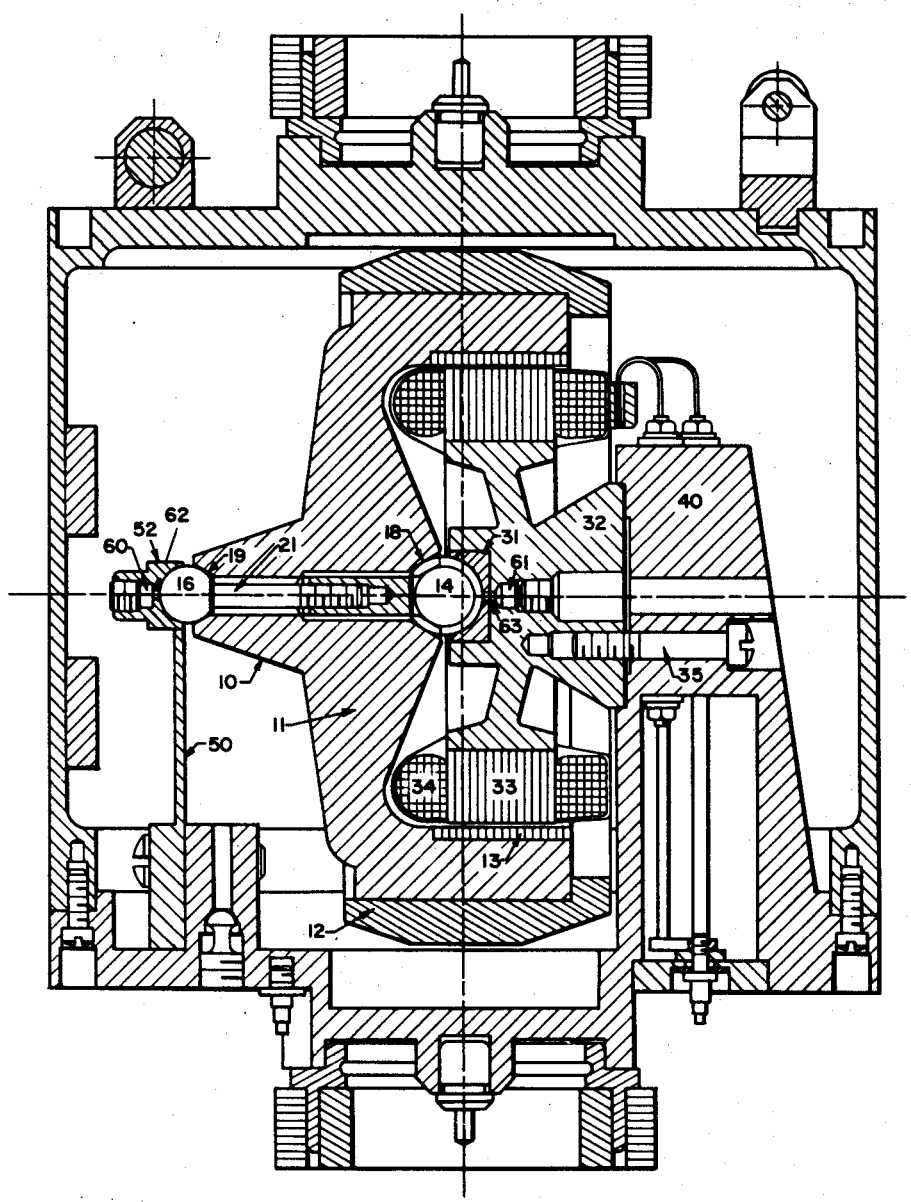
INVENTOR.
ERNEST BLANEY DANE, JR.
BY *Jack Larsen*

3,142,182
GYROSCOPE SPIN AXIS BEARINGS
Ernest Blaney Dane, Jr., Belmont, Mass., assignor to Massachusetts Institute of Technology, Cambridge, Mass., a corporation of Massachusetts
Filed Feb. 23, 1961, Ser. No. 91,275
3 Claims. (Cl. 74—5)

This invention relates to gyroscopes, and more particularly to spin axis bearings for gyroscopic instruments. The invention may be applied to all types of gyroscopes but is particularly applicable to floated single-degree-of-freedom gyroscopes as disclosed in C. S. Draper Patent 2,752,790 dated July 3, 1956.

There is a similarity in the function of spin axis bearings in all successful precision gyroscopes in that there is a film of fluid which separates the moving parts. This is as true of rolling contact bearings as for gas or liquid lubricated journal types. Thickness of the film in the bearing affects the axial position of the wheel, and therefore, the balance of the suspension. Both will change whenever the film in one of two spin axis bearings changes with respect to the other. Radial shifts are generally much smaller because of the rapid rotation. Usually they are completely negligible. Unfortunately the thickness of the film is not a linear function of acceleration applied to the gyro as a whole. In both ball and fluid lubricated types two other effects appear. Pure linear acceleration powers higher than the square are significant in governing the yield and furthermore spontaneous changes occur. The latter are the more important as a rule. In ball bearings these spontaneous shifts appear to be due to the sudden motion of oil drops, while in air bearings a still larger shift may occur due to the negative temperature coefficient of viscosity and the relatively large amounts of power which are used. Elimination of these spontaneous changes in ball bearings has required stringent quality control in the selection of only the best bearings produced by the best manufacturers and operating these selected bearings with so little lubricating oil that the life of the bearings may be impaired.

In fluid lubricated journal type bearings balance shifts would be reduced by designing the bearings for operation with extremely thin fluid films. Such bearings are known as "boundary layer" lubricated bearings. The oil films are of the order of a few millionths of an inch in thickness. The use of such bearings on gyro spin axes heretofore has been impractical because of thermal expansion and contraction of the parts which can not be accommodated within the small clearances provided in bearings of this type.

It is an object of this invention to provide a gyroscope rotor assembly employing "boundary layer" lubricated journal bearings in which the effect of thermal expansion and contraction of the parts is minimized. Further objects and advantages of the invention will be apprehended from the attached figure which is a cross section view of an assembly embodying the invention.

The gyro rotor 10 comprises a light metal hub 11, a heavy metal rim 12, permanent magnetic hysteresis rings 13, a principal spherical support journal 14 and a supplemental support journal 16. The hub is maintained in coaxial relation to the line of centers between the journals 14 and 16 by means of conical seats 18 and 19 and adjustable tie bolt 21.

The design of the rotor is such that the center of the principal support journal 14 is located at the center of gravity of the rotor assembly. The spherical bearing 31 mates with the journal 14 to provide the main support for the rotor. Mounting piece 32 for the bearing 31 also carries synchronous motor laminations 33 and windings 34. The piece 32 is rigidly attached by means of screws 35 to the case 40. Also attached to the case 40 is a flat spring 50 supporting a second spherical bearing 52 which constrains the journal 16 to a single-degree-of-freedom. The spring 50 is preformed so that in operating position it is substantially flat and in the plane perpendicular to the bearing axis of the center of the journal 16 while pressing the bearing 52 with a substantial preload against the journal 16. A supply of lubricating oil for the bearings is provided in reservoirs 60 and 61 which are connected to the journal-bearing interface by small holes 62 and 63. The spheres and the spherical bearings are both finished to a very high degree of smoothness so that the bearings, in operation, use a very small amount of oil.

Having thus described the invention, that which is claimed is:

1. A precision gyroscopic instrument assembly comprising a first spherical bearing, a re-entrant rotor, a first spherical journal attached to said rotor at the center of gravity of said rotor, and supported precisely concentrically in said first spherical bearing, a flat spring lying in a plane substantially perpendicular to the spin axis of said rotor and at a distance from said first spherical journal, a second spherical bearing attached to one end of said flat spring, and a second spherical journal attached to said rotor on said spin axis and engaging said second spherical bearing with the center of said second spherical journal lying substantially in the plane of said flat spring, and rigid mounting means interconnecting said flat spring and said first spherical bearing.

2. A gyroscopic assembly comprising a spherical first bearing, a re-entrant rotor, a spherical first journal attached to said rotor at the center of gravity of said rotor, and supported by boundary layer lubrication in said spherical bearing, a flat spring lying in a plane substantially perpendicular to the spin axis of said rotor and at a distance from said spherical journal, a second boundary-layer-lubricated bearing attached to one end of said flat spring, and a second journal attached to said rotor on said spin axis and engaging said second bearing, and rigid mounting means interconnecting said flat spring and said spherical bearing.

3. A gyroscopic assembly comprising a rotor, said rotor having two, and only two, spaced apart spherical support journal portions, the centers of said spherical portions lying on and determining the spin axis of said rotor, the center of the first of said two spherical journal portions being coincident with the center of gravity of said rotor, a first boundary-layer-lubricated spherical bearing accurately fitting and supporting said first journal portion, a flat spring lying in a plane substantially perpendicular to said spin axis, a second spherical boundary-layer-lubricated journal mounted on said flat spring and mating with said second spherical portion, and rigid mounting means interconnecting said spring and said first bearing.

References Cited in the file of this patent

UNITED STATES PATENTS

| | | |
|---|---|---|
| 791,983 | Leblanc | June 6, 1905 |
| 1,904,770 | Skillman | Apr. 18, 1933 |
| 2,086,897 | Carter et al. | July 13, 1937 |
| 2,729,106 | Mathiesen | Jan. 3, 1956 |